United States Patent
Christofaro et al.

(10) Patent No.: US 6,513,242 B1
(45) Date of Patent: *Feb. 4, 2003

(54) METHOD OF MANUFACTURING A VEHICLE BODY AND FRAME ASSEMBLY INCLUDING HYDROFORMED SIDE RAILS

(75) Inventors: Paul A. Christofaro, Reading, PA (US); Mark W. Kiehl, Reading, PA (US)

(73) Assignee: Dana Corporation, Toledo, OH (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/911,955

(22) Filed: Aug. 15, 1997

(51) Int. Cl.$^7$ .................... B21D 53/88; B62D 21/00
(52) U.S. Cl. ................ 29/897.2; 29/421.1; 280/797; 280/798
(58) Field of Search .................. 29/897.2, 421.1; 72/61, 58; 296/203.1, 204, 205; 280/797, 798

(56) References Cited

U.S. PATENT DOCUMENTS

| | | | | |
|---|---|---|---|---|
| 1,846,567 A | * | 2/1932 | Murray, Jr. | 280/797 |
| 2,009,963 A | * | 7/1935 | Matthaei | 280/797 |
| 2,107,382 A | | 2/1938 | Maddock | 280/106 |
| 2,174,922 A | * | 10/1939 | Kuiper | 280/798 |
| 2,192,560 A | * | 3/1940 | Riemenschneider | 280/797 |
| 4,829,803 A | | 5/1989 | Cudini | 72/367 |
| 5,333,775 A | | 8/1994 | Bruggemann et al. | 228/157 |
| 5,339,667 A | | 8/1994 | Shah et al. | 72/58 |
| 5,499,520 A | | 3/1996 | Roper | 72/58 |
| 5,557,961 A | | 9/1996 | Ni et al. | 72/61 |
| 5,561,902 A | | 10/1996 | Jacobs et al. | 29/897.2 |
| 5,720,092 A | * | 2/1998 | Ni et al. | 29/421.1 |
| 5,845,382 A | * | 12/1998 | Schultz et al. | 29/421.1 |
| 5,862,877 A | * | 1/1999 | Horton et al. | 180/312 |
| 5,865,362 A | * | 2/1999 | Behrmann et al. | 29/897.2 |
| 5,884,722 A | * | 3/1999 | Durand et al. | 180/312 |
| 5,927,120 A | * | 7/1999 | Marando | 72/61 |
| 6,138,358 A | * | 10/2000 | Marando | 29/421.1 |
| 6,168,204 B1 | * | 1/2001 | Beckman | 29/897.2 |
| 6,183,013 B1 | * | 2/2001 | Mackenzie et al. | 280/797 |
| 6,282,790 B1 | * | 9/2001 | Jaekel et al. | 29/421.1 |
| 6,308,412 B1 | * | 10/2001 | Christofaro et al. | 29/421.1 |
| 6,408,515 B1 | * | 6/2002 | Durand | 29/421.1 |

* cited by examiner

Primary Examiner—David P. Bryant
(74) Attorney, Agent, or Firm—MacMillan, Sobanski & Todd, LLC

(57) ABSTRACT

A method is disclosed for manufacturing a vehicle body and frame assembly including a pair of side rails, each of which is formed from a single closed channel structural member that extends the entire length of the vehicle body and frame assembly and is deformed into a desired shape by hydroforming. The first step in the process is to provide a length of stock material, preferably a tubular metallic workpiece, having a predetermined length. The tubular workpiece is then typically pre-bent by a conventional tube bending apparatus to have some or all of the bends in the side rails to be formed. The bends initially formed in the workpiece during this pre-bending step usually do not have the exact angles and shapes which result in the final product. Rather, this initial pre-bending operation is performed to facilitate the insertion of the workpiece within a die cavity defined by cooperating die sections of a hydroforming die. The next step in the method involves hydroforming the pre-bent workpiece to a desired shape. The hydroforming die may be configured to include whatever shapes, including recesses, protuberances, openings, and the like, as are necessary to form the desired final shape for the side rails to be formed. In the final step of the method, the two hydroformed side rails are connected together by cross members to complete the vehicle frame assembly.

3 Claims, 2 Drawing Sheets

METHOD OF MANUFACTURING A VEHICLE BODY AND FRAME ASSEMBLY INCLUDING HYDROFORMED SIDE RAILS

BACKGROUND OF THE INVENTION

This invention relates in general to body and frame assemblies for vehicles. More specifically, this invention relates to an improved method for manufacturing a vehicle body and frame assembly including a pair of side rails, each of which is formed from a single closed channel structural member that extends the entire length of the vehicle body and frame assembly and is formed into a desired shape by hydroforming.

Many land vehicles in common use, such as automobiles, vans, and trucks, include a body and frame assembly that is supported upon a plurality of ground engaging wheels by a resilient suspension system. The structures of known body and frame assemblies can be divided into two general categories, namely, separate and unitized. In a typical separate body and frame assembly, the structural components of the body portion and the frame portion are separate and independent from one another, When assembled, the frame portion of the assembly is resiliently supported upon the vehicle wheels by the suspension system and serves as a platform upon which the body portion of the assembly and other components of the vehicle can be mounted. Separate body and frame assemblies of this general type are found in most older vehicles, but remain in common use today for many relatively large or specialized use modern vehicles, such as large vans, sport utility vehicles, and trucks. In a typical unitized body and frame assembly, the structural components of the body portion and he frame portion are combined into an integral unit that is resiliently supported upon he vehicle wheels by the suspension system. Unitized body and frame assemblies of his general type are found in many relatively small modern vehicles, such as automobiles and minivans.

One well known example of a separate of vehicular body and frame assembly is commonly referred to as a ladder frame assembly. A ladder frame assembly includes a pair of longitudinally extending side rails that are joined together by a plurality of transversely extending cross members. The cross members connect the two side rails together and provide desirable lateral, vertical, and torsional stiffness to the ladder frame assembly. The cross members can also be used to provide support for various components of the vehicle. Depending upon the overall length of the vehicle and other factors, the side rails of a conventional ladder frame assembly may be formed either from a single, relatively long structural member or from a plurality of individual, relatively short structural members that are secured together. For example, in vehicles having a relatively short overall length, it is known to form each of the side rails from a single integral structural member that extends the entire length of the vehicle body and frame assembly. In vehicles having a relatively long overall length, it is known to form each of the side rails from two or more individual structural members that are secured together, such as by welding, to provide a unitary structural member that extends the entire length of the vehicle body and frame assembly.

Traditionally, the side rails of known vehicle body and frame assemblies have been formed exclusively from open channel structural members, i.e., structural members that have a non-continuous cross sectional shape (U-shaped or C-shaped channel members, for example). Thus, it is known to use a single integral open channel structural member to form a side rail that extends the entire length of the vehicle body and frame assembly, as described above. Additionally, it is known to secure a plurality of such open channel structural members together to form the individual sections of a unitary side rail for a vehicle body and frame assembly, as also described above. However, the use of open channel structural members to form the side rails for vehicle body and frame assemblies has been found to be undesirable for several reasons. First, it is relatively time consuming and expensive to bend multiple portions of the side rails to conform to a desired fmal shape, as is commonly necessary. Second, after such bending has been performed, a relatively large number of brackets or other mounting devices must usually be secured to each of the side rails to facilitate the attachment of the various components of the vehicle to the body and frame assembly. Third, in those instances where the side rails are formed from a plurality of individual sections, it has been found difficult to maintain dimensional stability throughout the length of the side rail when the individual side rail sections are secured together. Thus, known vehicle body and frame assemblies having side rails formed from one or more open channel structural members have been found to be deficient.

More recently, in side rails formed from two or more individual structural members, it has been proposed to form one of the individual side rail sections from a closed channel structural member i.e., a structural member that has a continuous cross sectional shape (tubular or box-shaped channel members, for example). The remaining individual side rail sections have been formed from open channel structural members. The closed channel structural member is secured to the open channel structural member or members to form the unitary side rail that extends the entire length of the vehicle body and frame assembly, as described above. In vehicle body and frame assemblies of this type, it is known that the closed channel structure member may be deformed to a desired shape by hydroforming prior to being secured to the open channel structural member. Hydroforming is a well known process that uses pressurized fluid to deform a tubular member into a desired shape. To accomplish this, the tubular member is initially disposed between two die sections of a hydroforming apparatus which, when closed together, define a die cavity having a desired fmal shape. Thereafter, the tubular member is filled with a pressurized fluid, typically a relatively incompressible liquid such as water. The pressure of the fluid is increased to a magnitude where the tubular member is expanded outwardly into conformance with the die cavity. As a result, the tubular member is deformed into the desired fmal shape.

Hydroforming has been found to be a desirable process for deforming the closed channel structural member because the individual side rail section can be quickly and easily deformed to have a desired cross sectional shape. For example, the individual side rail section may be formed having a generally rectangular or box-shaped cross section. This cross sectional shape is advantageous not only because it provides strength and rigidity to the individual side rail section, but also because it provides vertically and horizontally oriented side surfaces which facilitate the attachment of various brackets and mounts used to support other components of the vehicle on the vehicle frame structure. However, because the open channel structural member is then secured to the remaining open channel side rail sections, many of the problems mentioned above in connection with open channel structural members remain. Thus, it would be desirable to provide an improved for manufacturing a side rail for a vehicle body and frame assembly that addresses these problems.

SUMMARY OF THE INVENTION

This invention relates to an improved method for manufacturing a vehicle body and frame assembly including a pair of side rails, each of which is formed from a single closed channel structural member that extends the entire length of the vehicle body and frame assembly and is deformed into a desired shape by hydroforming. The first step in the process is to provide a length of stock material, preferably a tubular metallic workpiece, having a predetermined length. The tubular workpiece is then typically pre-bent by a conventional tube bending apparatus to have some or all of the-bends in the side rails to be formed. The bends initially formed in the workpiece during this pre-bending step usually do not have the exact angles and shapes which result in the fmal product. Rather, this initial pre-bending operation is performed to facilitate the insertion of the workpiece within a die cavity defined by cooperating die sections of a hydroforming die. The next step in the method involves hydroforming the pre-bent workpiece to a desired shape. The hydroforming die may be configured to include whatever shapes, including recesses, protuberances, openings, and the like, as are necessary to form the desired final shape for the side rails to be formed. In the initial step of the method, the two hydroformed side rails are connected together by ross members to complete the vehicle frame assembly.

Various objects and advantages of this invention will become apparent to those skilled in the art from the following detailed description of the preferred embodiment, when read in light of the accompanying drawings.

DETAILED DESCRIPTION OF THE PREFERRED EMBODIMENT

Figure 1:
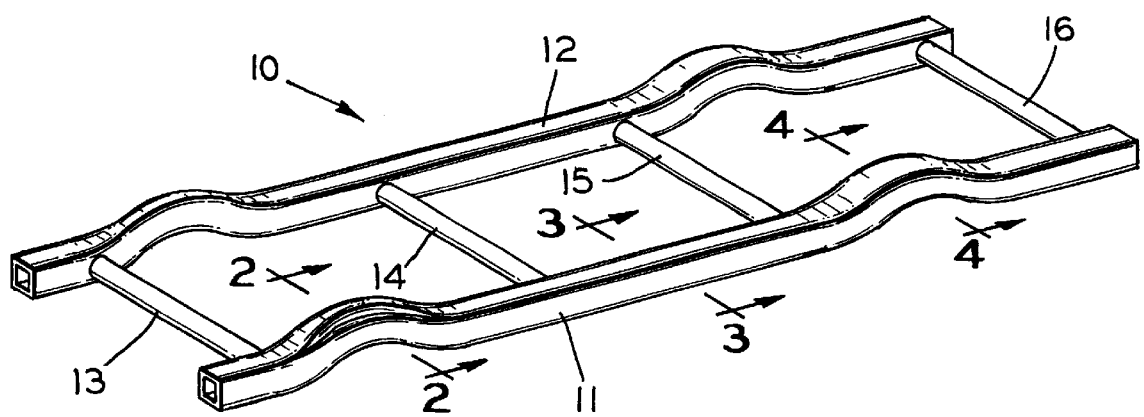
FIG. 1 is a schematic perspective view of a vehicle body and frame assembly manufactured in accordance with the method of this invention.

Referring now to the drawings, there is schematically illustrated in FIG. 1 a vehicle body and frame assembly, indicated generally at 10, that has been manufactured in accordance with the method of this invention. The illustrated frame assembly 10 is a ladder frame assembly. However, it will be appreciated that the method of this invention may be utilized in the manufacture of any type of vehicle body and frame assembly. The illustrated ladder frame assembly 10 includes a pair of longitudinally extending side rails 11 and 12 having a plurality of transverse cross member 13, 14, 15, and 16 extending therebetween. The side rails 11 and 12 extend longitudinally throughout the entire length of the assembly 10 and are generally parallel to one another. The structure of the side rails 11 and 12 and the method of manufacture thereof will be discussed in detail below.

The cross members 13, 14, 15 and 16 extend generally perpendicular to the side rails 11 and 12 and may be formed having any conventional structure. The cross members 13, 14, 15, and 16 are spaced apart from one another along the length of the assembly 10 and can be secured to the side rails 11 and 12 by any conventional means, such as by welding, rivets, and the like. When secured to the side rails 11 and 12, the cross members 13, 14, 15, and 16 provide desired rigidity to the assembly 10. Although four cross members 13, 14, 15, and 16 are shown in FIG. 1, it will be appreciated that a greater or lesser number of such cross members may be provided. The cross members 13, 14, 15, and 16 can be formed having any desired structure and may be formed from any desired material.

Figure 2:
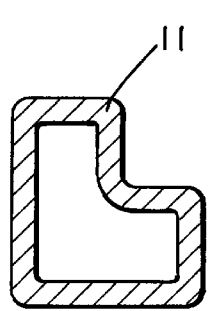
FIG. 2 is an enlarged sectional elevational view taken along line 2—2 of FIG. 1.
Figure 3:
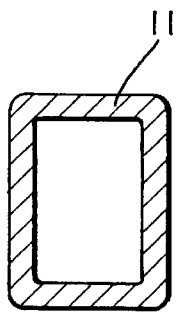
FIG. 3 is an enlarged sectional elevational view taken along line 3—3 of FIG. 1.
Figure 4:
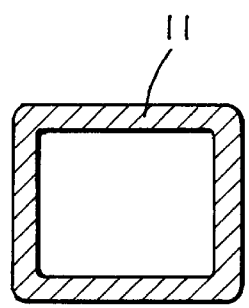
FIG. 4 is an enlarged sectional elevational view taken along line 4—4 of FIG. 1.

The side rails 11 and 12 are each formed from single integral closed channel structural member that has been deformed to a desired shape. As shown in FIGS. 2, 3, and 4, the cross sectional shapes of the side rail 11 may vary throughout the length thereof. For example, the first side rail 11 may include a first portion having a generally L-shaped cross section as shown in FIG. 2, a second portion having a generally rectangular cross sectional shape as shown in FIG. 3, and a third portion having a generally square cross sectional shape as shown in FIG. 4. It will be appreciated, however, that the side rail 11 may be formed having any desired cross sectional shape. The second side rail 12 may be formed in a similar manner and may, but need not, have the same shape as the first side rail 11. The closed channel configuration of the side rails 11 and 12 is advantageous because it provides strength and rigidity to the assembly 10 beyond that provided by conventional open channel structural members. Also, the closed channel configuration of the side rails 11 and 12 can provide vertically and horizontally oriented side surfaces that facilitate the attachment of various brackets and mounts (not shown) for supporting other components of the vehicle on the assembly 10.

Figure 5:
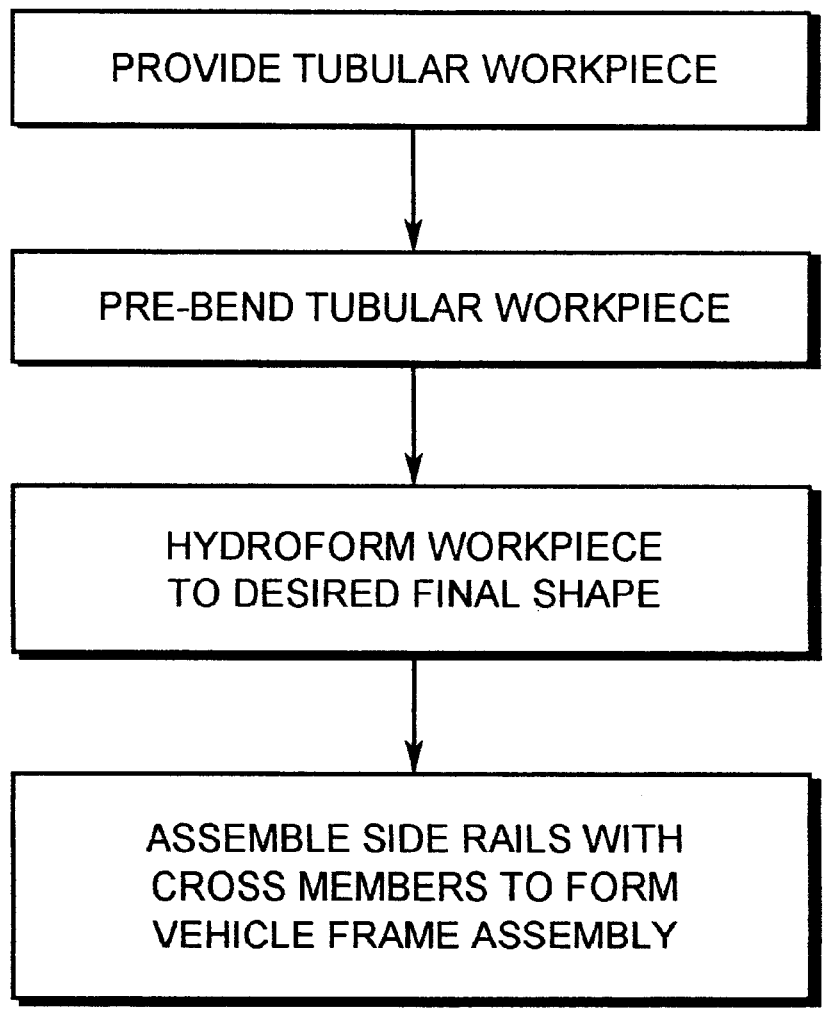
FIG. 5 is a flow chart illustrating the steps in the method of manufacturing the vehicle body and frame assembly illustrated in FIG. 1.

The method of manufacturing the above-described vehicle frame assembly 10 is illustrated in FIG. 5. As shown therein, the first step in the process is to provide a length of stock material, preferably a tubular metallic workpiece, having a predetermined length. The tubular workpiece is then typically pre-bent by a conventional tube bending apparatus to have some or all of the bends shown in the side rails 11 and 12 of FIG. 1. The bends initially formed in the workpiece during this pre-bending step usually do not have the exact angles and shapes which result in the fmal product. Rather, this initial pre-bending operation is performed to facilitate the insertion of the workpiece within a die cavity defined by cooperating die sections of a hydroforming die.

The next step in the method involve hydroforming pre-bent workpiece to a desired shape. As mentioned above, hydroforming is a well known process that uses pressurized fluid to deform a tubular member into a desired shape. To accomplish this, the pre-bent workpiece is disposed between the two die sections of the hydroforming apparatus, then closing the die sections together to define a die cavity having a desired final shape. In some instances, the closure of the die sections may effect some further mechanical bending of the pre-bent workpiece. Thereafter, the pre-bent workpiece is filled with a pressurized fluid, typically a relatively incompressible liquid such as water. The pressure of the fluid is increased to a magnitude where the pre-bent workpiece is expanded outwardly into conformance with the die cavity. The hydroforming die may be configured to include whatever shapes, including recesses, protuberances, openings, and the like, as are necessary to form the desired final shape for the side rails 11 and 12. In the final step of the method, the two hydroformed side rails are connected together by the cross members 13, 14, 15, and 16 to complete the vehicle frame assembly 10.

The hydroforming process has been found to be quite advantageous for forming the illustrated side rails 11 and 12. In particular, the hydroforming process allows the side rails 11 and 12 to be formed as a single integral structure that extends the entire length of the vehicle frame assembly 10, eliminating the need for welding or other joining techniques. This has been found to improve the overall quality of the side rails 11 and 12, as well as reduce the weight thereof and eliminate assembly weld distortion. The hydroforming process also facilitates the manufacture of complex shapes in the side rails in a rapid manner.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. A method for manufacturing a vehicle body and frame assembly having a predetermined length and being supported upon a plurality of ground-engaging wheels by a resilient suspension system, said method comprising the steps of:

(a) providing a single integral workpiece having a closed channel cross sectional shape and a length that is substantially the same as the predetermined length of the vehicle body and frame assembly;

(b) hydroforming the single integral workpiece to form a completed first side rail having a desired shape and a length that is substantially the same as the predetermined length of the vehicle body and frame assembly;

(c) providing a second side rail;

(d) providing a plurality of cross members;

(e) securing the cross members to the side rails to form the vehicle body and frame assembly; and (f) supporting the vehicle body and frame assembly upon a plurality of ground-engaging wheels by a resilient suspension system.

2. The method defined in claim 1 including the further step of pre-bending the single integral workpiece into a desired shape prior to said step (b).

3. The method defined in claim 1 wherein said step (c) is performed by providing a second single integral workpiece having a closed channel cross sectional shape and hydroforming the second single integral workpiece to form a completed second side rail having a desired shape and a length that is substantially the same as the predetermined length of the vehicle body and frame assembly.

* * * * *